US012758953B2

(12) United States Patent
Zhang et al.

(10) Patent No.: US 12,758,953 B2
(45) Date of Patent: Oct. 13, 2026

(54) HYDROISOMERIZATION CATALYSTS

(71) Applicant: CHEVRON U.S.A. Inc., San Ramon, CA (US)

(72) Inventors: Yihua Zhang, Albany, CA (US); Adeola Ojo, Pleasant Hill, CA (US); Guan-Dao Lei, Walnut Creek, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 544 days.

(21) Appl. No.: 18/261,481

(22) PCT Filed: Jan. 13, 2022

(86) PCT No.: PCT/IB2022/050225
§ 371 (c)(1),
(2) Date: Jul. 13, 2023

(87) PCT Pub. No.: WO2022/153197
PCT Pub. Date: Jul. 21, 2022

(65) Prior Publication Data

US 2024/0299918 A1 Sep. 12, 2024

Related U.S. Application Data

(62) Division of application No. 17/147,725, filed on Jan. 13, 2021, now Pat. No. 11,865,527.

(51) Int. Cl.

| | |
|---|---|
| ***B01J 29/76*** | (2006.01) |
| ***B01J 29/00*** | (2006.01) |
| ***B01J 35/30*** | (2024.01) |
| ***B01J 35/70*** | (2024.01) |
| ***C10G 45/64*** | (2006.01) |

(52) U.S. Cl.
CPC ........... *B01J 29/7661* (2013.01); *B01J 29/00* (2013.01); *B01J 35/30* (2024.01); *B01J 35/70* (2024.01); *C10G 45/64* (2013.01); *B01J 2235/15* (2024.01)

(58) Field of Classification Search
CPC ... B01J 21/04; B01J 23/42; B01J 23/44; B01J 23/58; B01J 29/00; B01J 29/005; B01J 29/703; B01J 29/7446; B01J 29/7461; B01J 29/7646; B01J 29/7661; B01J 29/80; B01J 35/30; B01J 35/50; B01J 35/70; B01J 37/0018; B01J 37/08; B01J 2229/18; C10G 45/64
See application file for complete search history.

(56) References Cited

U.S. PATENT DOCUMENTS

| | | | | |
|---|---|---|---|---|
| 5,282,958 | A | 2/1994 | Santilli | |
| 6,790,433 | B2 | 9/2004 | Chen | |
| 8,790,507 | B2 | 7/2014 | Krishna | |
| 9,802,830 | B2 * | 10/2017 | Ojo | B01J 29/80 |
| 9,920,260 | B2 | 3/2018 | Ojo | |
| 11,229,903 | B1 | 1/2022 | Zhang | |
| 11,865,527 | B2 | 1/2024 | Zhang | |
| 11,987,757 | B2 | 5/2024 | Krishna | |
| 2005/0092651 | A1 | 5/2005 | Zones | |
| 2011/0079540 | A1 | 4/2011 | Krishna | |
| 2016/0089664 | A1 | 3/2016 | Zhang et al. | |
| 2016/0089666 | A1 | 3/2016 | Zhang | |
| 2017/0056870 | A1 | 3/2017 | Ojo | |
| 2022/0305471 | A1 * | 9/2022 | Ojo | B01J 37/031 |

FOREIGN PATENT DOCUMENTS

| | | | |
|---|---|---|---|
| CN | 102365347 | A | 2/2012 |
| CN | 103031144 | A | 4/2013 |
| CN | 101939102 | A | 6/2013 |
| TW | 201714826 | A | 5/2017 |
| WO | 2017034823 | | 3/2017 |

OTHER PUBLICATIONS

International Search Report, issued on Apr. 12, 2022, during the prosecution of International Application No. PCT/IB2022/050225.
Written Opinion of the International Searching Authority, issued on Apr. 12, 2022, during the prosecution of International Application No. PCT/IB2022/050225.
Baerlocher et al., "Atlas of zeolite framework types." Elsevier, 6th revised edition, 2007.
International Zeolite Association. "International Zeolite Association." https://www.iza-online.org/ (retrieved Sep. 11, 2025). 4 pages.
Kirschhock et al. "Ordered end-member of ZSM-48 zeolite family." Chemistry of Materials 21.2 (2009): 371-380.
Lillerud et al. "Systematic Relationships Between the Structures of CHA, AEI and KFI." Studies in Surface Science and Catalysis. vol. 84. Elsevier, 1994. pp. 543-550.
Lobo and Koningsveld; "New Description of the Disorder in Zeolite ZSM-48"; J. Am. Chem. Soc., 2002, vol. 124, pp. 13222-13230.

(Continued)

*Primary Examiner* — Brian A Mccaig
(74) *Attorney, Agent, or Firm* — Mark Warzel

(57) ABSTRACT

A hydroisomerization catalyst comprising a molecular sieve belonging to the ZSM-48 family of zeolites; an inorganic oxide support; one or more first modifiers selected from Groups 8 to 10; and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd). The molecular sieve comprises: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product. The molecular sieve has a morphology characterized as polycrystalline aggregates comprising crystallites collectively having an average aspect ratio of between about 1 and about 8.

8 Claims, No Drawings

(56) References Cited

OTHER PUBLICATIONS

Treacy et al. "A general recursion method for calculating diffracted intensities from crystals containing planar faults." Proceedings of the Royal Society of London. Series A: Mathematical and Physical Sciences 433.1889 (1991): 499-520.
Treacy et al. Collection of simulated XRD powder patterns for zeolites fourth (4th) revised edition. Elsevier, 2001.

* cited by examiner

HYDROISOMERIZATION CATALYSTS

CROSS REFERENCE TO RELATED APPLICATIONS

This application is related to the following applications, and claims the benefit of priority thereto, as a 371 application of PCT/IB2022/050225, filed on Jan. 13, 2022; and is a divisional of U.S. patent application Ser. No. 17/147,725, filed on Jan. 13, 2021, the disclosures of which are herein incorporated in their entirety.

TECHNICAL FIELD

The present disclosure concerns hydroisomerization catalysts, methods of making hydroisomerization catalysts, methods of hydroisomerizing hydrocarbonaceous feedstocks, and associated uses.

BACKGROUND

Hydroisomerization is an important refining process used, for example, to catalytically dewax hydrocarbonaceous feedstocks. Dewaxing improves the low temperature properties of lubricating base oils and fuel fractions. Catalytic dewaxing removes long chain n-paraffins from the feedstock which, if otherwise not removed, have a negative impact on the pour and cloud points of the fractions; however, dewaxing can also lower the Viscosity Index (VI) of the base oil fraction as well. A high VI is necessary to provide the base oil with temperature range insensitivity, meaning the base oil is capable of providing lubricity at both low and high temperatures.

The American Petroleum Institute (API) categorises base oils into five Grades I-V. API Grades I-III concern base oils refined from crude petroleum and are distinguished by sulfur content, saturate level and VI, while Grades IV and V relate to synthetic base oils or base oils obtained from other sources (e.g. silicone). While Grade I and Grade II base oils require a VI between 80 and 120, a base oil refined from petroleum must achieve a VI greater than 120 to qualify as a Grade III base oil.

Refiners operating a catalytic dewaxing unit wish to maximize yields and meet the target product specifications (VI, pour point), while minimizing the reactor temperature (which corresponds to costly hydrogen consumption and VI reduction at higher temperatures) and light ends production.

Generally, conventional hydroisomerization catalysts used in catalytic dewaxing comprise: at least one molecular sieve suitable for isomerizing long-chain n-paraffins; a binding material (also referred to as the "support material") such as alumina, titania, silica, etc.; and one or more active hydrogenation/dehydrogenation metals selected from Groups 6 and 8-10 of the Periodic Table, particularly platinum and palladium.

There are two broad classes of reactions that occur in the hydroisomerization process. The first class of reactions involves hydrogenation/dehydrogenation, in which aromatic impurities are removed from the feedstock by saturation. The second class of reactions involves isomerization, in which long chain n-paraffins are isomerized to their branched counterparts. Hydroisomerization catalysts are bifunctional: hydrotreating is facilitated by the hydrogenation function provided by the metal components, and the isomerization reaction is facilitated by the acidic molecular sieve components. Both reactions need the presence of high-pressure hydrogen.

Molecular sieves have distinct crystal structures which are demonstrated by distinct X-ray diffraction patterns. The crystal structure defines cavities and pores which are characteristic of the different species.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the "Atlas of Zeolite Framework Types" Sixth Revised Edition, Elsevier (2007) and the Database of Molecular sieve Structures on the International Zeolite Association's website (http://www.iza-online.org).

The structure of a molecular sieve can be either ordered or disordered. Molecular sieves having an ordered structure have periodic building units (PerBUs) that are periodically ordered in all three dimensions. Structurally disordered structures show periodic ordering in dimensions less than three (i.e., in two, one or zero dimensions). Disorder occurs when the PerBUs connect in different ways, or when two or more PerBUs intergrow within the same crystal. Crystal structures built from PerBUs are called end-member structures if periodic ordering is achieved in all three dimensions.

In disordered materials, planar stacking faults occur where the material contains ordering in two dimensions. Planar faults disrupt the channels formed by the material's pore system. Planar faults located near the surface limit diffusion pathways otherwise required in order to allow feedstock components to access the catalytically active portions of the pore system. Therefore, as the degree of faulting increases, the catalytic activity of the material typically decreases.

In the case of crystals with planar faults, interpretation of X-ray diffraction patterns requires an ability to simulate the effects of stacking disorder. DIFFaX is a computer program based on a mathematical model for calculating intensities from crystals containing planar faults. (See, M. M. J. Treacy et al., Proceedings of the Royal Chemical Society, London, A (1991), Vol. 433, pp. 499-520). DIFFaX is the simulation program selected by and available from the International Zeolite Association to simulate the XRD powder patterns for intergrown phases of molecular sieves. (See, "Collection of Simulated XRD Powder Patterns for Zeolites" by M. M. J. Treacy and J. B. Higgins, 2001, Fourth Edition, published on behalf of the Structure Commission of the International Zeolite Association). It has also been used to theoretically study intergrown phases of AEI, CHA and KFI molecular sieves, as reported by K. P. Lillerud et al. in "Studies in Surface Science and Catalysis", 1994, Vol. 84, pp. 543-550. DIFFaX is a well-known and established method to characterize disordered crystalline materials with planar faults such as intergrown molecular sieves.

The designation ZSM-48 refers to a family of disordered materials, each characterized as having a one-dimensional 10-ring tubular pore system. The pores are formed of rolled up honeycomb-like sheets of fused tetrahedral 6-ring structures, and the pore aperture contains 10 tetrahedral-atoms. Zeolites EU-2, ZSM-30 and EU-11 fall into the ZSM-48 family of zeolites.

According to Lobo and Koningsveld, the ZSM-48 family of molecular sieves consists of nine polytypes. (See J. Am. Chem. Soc. 2002, 124, 13222-13230). These materials have very similar, but not identical, X-ray diffraction patterns. The Lobo and Koningsveld paper describes their analysis of three ZSM-48 samples provided by Dr. Alexander Kuperman of Chevron Corporation. Each of the three samples, labeled Samples A, B and C, respectively, were prepared using three different structure directing agents.

The Lobo and Koningsveld paper describes Sample A as being polytype 6, and Sample B as being a faulted polytype 6. The paper further describes the morphology of Sample A as consisting of needle-like crystals having a diameter of ~20 nm and a length of ~0.5 μm. The morphology of Sample B consisted of long, narrow crystals having a width of ~0.5 μm and a length of 4-8 μm.

Kirschhock and co-workers describe the successful synthesis of phase-pure polytype 6. (See, Chem. Mater. 2009, 21, 371-380). In their paper, Kirschhock and co-workers describe their phase-pure polytype 6 material (which they refer to as COK-8) as having a morphology consisting of long needle-like crystals (width, 15-80 nm; length, 0.5-4 μm) with a very large length/width ratio, growing along the interconnecting pore direction.

As indicated in the Kirschhock paper, molecular sieves from the ZSM-48 family of molecular sieves consist of 10-ring, 1-dimensional pore structures, wherein the channels formed by the interconnected pores extend perpendicular to the long axis of the needles. Therefore, the channel openings are located at the short ends of the needles. As the length-to-diameter ratio (also known as aspect ratio) of these needles increases, so does the diffusion pathway for the hydrocarbon feed. As the diffusion pathway increases, so does the residence time of the feed in the channels. A longer residence time results in increased undesirable hydrocracking of the feed with a concomitant reduction in selectivity.

U.S. patent application Ser. No. 14/837,094 (published as US 2017/0056870 A1), naming Adeola Florence Ojo, Dan Xie, Yihua Zhang and Guan-Dao Lei as inventors, describes a molecular sieve belonging to the ZSM-48 family of zeolites. The molecular sieve is known as "molecular sieve SSZ-91" or simply "SSZ-91".

SUMMARY

According to a first aspect, the present invention is directed to a hydroisomerization catalyst comprising: a molecular sieve belonging to the ZSM-48 family of zeolites; an inorganic oxide support; one or more first modifiers selected from Groups 8 to 10; and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd). The molecular sieve comprises: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product. The molecular sieve has a morphology characterized as polycrystalline aggregates comprising crystallites collectively having an average aspect ratio of between about 1 and about 8.

In a second aspect, there is provided a method of making a hydroisomerization catalyst. The method comprises: forming a mixture comprising a molecular sieve belonging to the ZSM-48 family of zeolites and an inorganic oxide; extruding the mixture to form an extrudate or formed particle; drying the extrudate or formed particle; and calcining the dried extrudate or formed particle. The molecular sieve comprises: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product. The molecular sieve has a morphology characterized as polycrystalline aggregates comprising crystallites collectively having an average aspect ratio of between about 1 and about 8. The method further comprises incorporating into the hydroisomerization catalyst one or more first modifiers selected from Groups 8 to 10 and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd).

In a third aspect, there is provided a hydroisomerization catalyst manufactured by the method according to the second aspect.

In a fourth aspect, there is provided a method of hydroisomerizing a hydrocarbonaceous feedstock, the method comprising contacting the hydrocarbonaceous feedstock with a hydroisomerization catalyst according to the first aspect or the third aspect under hydroisomerization conditions to produce a hydroisomerized effluent.

In a fifth aspect, there is provided a use of a molecular sieve in a hydroisomerization catalyst to: increase the yield of a hydroisomerized effluent; increase the viscosity index of the hydroisomerized effluent; increase the selectivity of the hydroisomerization catalyst for hydroisomerization; and/or reduce the yield of short-chain hydrocarbons, when the hydroisomerization catalyst is used in the hydroisomerization of a hydrocarbonaceous feedstock. The molecular sieve belongs to the ZSM-48 family of zeolites. The molecular sieve comprises: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product. The molecular sieve has a morphology characterized as polycrystalline aggregates comprising crystallites collectively having an average aspect ratio of between about 1 and about 8. The hydroisomerization catalyst further comprises: an inorganic oxide support; one or more first modifiers selected from Groups 8 to 10; and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd).

In a sixth aspect, there is provided a use of one or more modifiers, selected from the group consisting of calcium (Ca), chromium (Cr), magnesium (Mg), lanthanum (La), barium (Ba), praseodymium (Pr), strontium (Sr), potassium (K) and neodymium (Nd), in a hydroisomerization catalyst to: increase the yield of a hydroisomerized effluent; increase the viscosity index of the hydroisomerized effluent; increase the selectivity of the hydroisomerization catalyst for hydroisomerization; and/or reduce the yield of short-chain hydrocarbons, when the hydroisomerization catalyst is used in the hydroisomerization of a hydrocarbonaceous feedstock. The hydroisomerization catalyst further comprises: a molecular sieve belonging to the ZSM-48 family of zeolites; an inorganic oxide support; and one or more metals selected from Groups 8 to 10. The molecular sieve comprises: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product. The molecular sieve has a morphology characterized as polycrystalline aggregates comprising crystallites collectively having an average aspect ratio of between about 1 and about 8.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

DETAILED DESCRIPTION

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof. In addition, all number ranges presented herein are inclusive of their upper and lower limit values.

If a standard test is mentioned herein, unless otherwise stated, the version of the test to be referred to is the most recent at the time of filing this patent application.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

An improved hydroisomerization catalyst comprises: a molecular sieve belonging to the ZSM-48 family of zeolites; an inorganic oxide support; one or more first modifiers selected from Groups 8 to 10; and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd).

Molecular Sieve

The terms "molecular sieve" and "zeolite" are synonymous and include (a) intermediate and (b) final or target molecular sieves and molecular sieves produced by (1) direct synthesis or (2) post-crystallization treatment (secondary modification). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004, hereby incorporated by reference in its entirety.

Molecular sieves have distinct crystal structures which are demonstrated by distinct X-ray diffraction patterns. The crystal structure defines cavities and pores which are characteristic of the different species.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the "Atlas of Zeolite Framework Types" Sixth Revised Edition, Elsevier (2007) and the Database of Molecular Sieve Structures on the International Zeolite Association's website (http://www.iza-online.org).

The structure of a molecular sieve can be either ordered or disordered. Molecular sieves having an ordered structure have periodic building units (PerBUs) that are periodically ordered in all three dimensions. Structurally disordered structures show periodic ordering in dimensions less than three (i.e., in two, one or zero dimensions). Disorder occurs when the PerBUs connect in different ways, or when two or more PerBUs intergrow within the same crystal. Crystal structures built from PerBUs are called end-member structures if periodic ordering is achieved in all three dimensions.

In disordered materials, planar stacking faults occur where the material contains ordering in two dimensions. Planar faults disrupt the channels formed by the material's pore system. Planar faults located near the surface limit diffusion pathways otherwise required in order to allow feedstock components to access the catalytically active portions of the pore system. Therefore, as the degree of faulting increases, the catalytic activity of the material typically decreases.

In the case of crystals with planar faults, interpretation of X-ray diffraction patterns requires an ability to simulate the effects of stacking disorder. DIFFaX is a computer program based on a mathematical model for calculating intensities from crystals containing planar faults. (See, M. M. J. Treacy et al., Proceedings of the Royal Chemical Society, London, A (1991), Vol. 433, pp. 499-520). DIFFaX is the simulation program selected by and available from the International Zeolite Association to simulate the XRD powder patterns for intergrown phases of molecular sieves. (See, "Collection of Simulated XRD Powder Patterns for Zeolites" by M. M. J. Treacy and J. B. Higgins, 2001, Fourth Edition, published on behalf of the Structure Commission of the International Zeolite Association). It has also been used to theoretically study intergrown phases of AEI, CHA and KFI molecular sieves, as reported by K. P. Lillerud et al. in "Studies in Surface Science and Catalysis", 1994, Vol. 84, pp. 543-550. DIFFaX is a well-known and established method to characterize disordered crystalline materials with planar faults such as intergrown molecular sieves.

The hydroisomerization catalyst comprises a molecular sieve belonging to the ZSM-48 family of zeolites. The molecular sieve is known as "molecular sieve SSZ-91" or simply "SSZ-91". SSZ-91 was described in U.S. patent application Ser. No. 14/837,094 (published as US 2017/0056870 A1), naming Adeola Florence Ojo, Dan Xie, Yihua Zhang and Guan-Dao Lei as inventors. U.S. patent application Ser. No. 14/837,094 and publication US 2017/0056870 A1 are hereby incorporated by reference in their entirety.

The designation ZSM-48 refers to a family of disordered materials, each characterised as having a one-dimensional 10-ring tubular pore system. The pores are formed of rolled up honeycomb-like sheets of fused tetrahedral 6-ring structures, and the pore aperture contains 10 tetrahedral atoms. Zeolites EU-2, ZSM-30 and EU-11 fall into the ZSM-48 family of zeolites. According to Lobo and Koningsveld, the ZSM-48 family of molecular sieves consists of nine polytypes. (See J. Am. Chem. Soc. 2002, 124, 13222-13230). These materials have very similar, but not identical, X-ray diffraction patterns. U.S. patent application Ser. No. 14/837,094 described the SSZ-91 family of crystalline molecular sieves. Molecular sieve SSZ-91 is structurally similar to sieves falling within the ZSM-48 family of zeolites, and is characterized as: (1) having a low degree of faulting, (2) a low aspect ratio that inhibits hydrocracking as compared to conventional ZSM-48 materials having an aspect ratio of greater than 8, and (3) is substantially phase pure.

As used herein, the term "substantially phase pure" means a material is completely free of zeolite phases other than those belonging to the ZSM-48 family of zeolites, or such other zeolite phases are present in quantities that have less than a measurable effect on, or confer less than a material disadvantage to, the selectivity of the material. Two common phases that co-crystalize with SSZ-91 are EUO-type molecular sieves such as EU-1, as well as Magadiite and Kenyaite. These additional phases may be present as separate phases or may be intergrown with the SSZ-91 phase. As demonstrated in U.S. patent application Ser. No. 14/837,094, the presence of high amounts of EU-1 in the product is deleterious to the selectivity for hydroisomerization by SSZ-91.

The molecular sieve (i.e. SSZ-91) in the hydroisomerization catalyst typically comprises: a silicon oxide to aluminium oxide mole ratio of about 40 to about 220; at least about 70% polytype 6 of the total ZSM-48-type material present in the product; and an additional EUO-type molecular sieve phase in an amount of between about 0 and about 7.0 percent by weight (inclusive) of the total product. The molecular sieve (i.e. SSZ-91) in the hydroisomerization catalyst typically has a morphology characterized as polycrystalline aggregates comprising crystallites collectively having an average aspect ratio of between about 1 and about 8 (inclusive).

The molecular sieve (i.e. SSZ-91) may have a silicon oxide to aluminium oxide mole ratio of no less than about 50, for example, no less than about 70, or no less than about 75, or no less than about 80, or no less than about 100, or no less than about 125. The molecular sieve (i.e. SSZ-91) may have a silicon oxide to aluminium oxide mole ratio no greater than about 200, for example, no greater than about 175, or no greater than about 160, or no greater than about 150, or no greater than about 140, or no greater than about 125. The molecular sieve (i.e. SSZ-91) may have a silicon oxide to aluminium oxide mole ratio from about 50 to about 220, for example, from about 70 to about 220, or from about 75 to about 220, or from about 80 to about 220, or from about 100 to about 220, or from about 125 to about 220, or from about 40 to about 200, or from about 70 to about 200, or from about 75 to about 200, or from about 80 to about 200, or from about 100 to about 200, or from about 125 to about 200, or from about 40 to about 175, or from about 40 to about 160, or from about 40 to about 150, or from about 40 to about 140, or from about 40 to about 125, or from about 50 to about 200, or from about 50 to about 175, or from about 50 to about 160, or from about 50 to about 150, or from about 50 to about 140, or from about 50 to about 125, or from about 70 to about 200, or from about 70 to about 175, or from about 70 to about 160, or from about 70 to about 150, or from about 70 to about 140, or from about 70 to about 125, or from about 75 to about 200, or from about 75 to about 175, or from about 75 to about 160, or from about 75 to about 150, or from about 75 to about 140, or from about 75 to about 125, or from about 80 to about 200, or from about 80 to about 175, or from about 80 to about 160, or from about 80 to about 150, or from about 80 to about 140, or from about 80 to about 125, or from about 100 to about 200, or from about 100 to about 175, or from about 100 to about 160, or from about 100 to about 150, or from about 100 to about 140, or from about 100 to about 125, or from about 125 to about 200, or from about 125 to about 175, or from about 125 to about 160, or from about 125 to about 150, or from about 125 to about 140.

The molecular sieve (i.e. SSZ-91) may comprise at least about 75%, for example, at least about 80%, or at least about 85%, or at least about 90%, or at least about 95%, of polytype 6 of the total ZSM-48-type material present in the product. The molecular sieve (i.e. SSZ-91) may comprise up to about 100%, for example, no greater than about 99%, or no greater than about 95%, or no greater than about 90%, of polytype 6 of the total ZSM-48-type material present in the product. The molecular sieve (i.e. SSZ-91) may comprise from about 70% to about 100%, for example, from about 70% to about 99%, or from about 70% to about 95%, or from about 70% to about 90%, or from about 80% to about 100%, or from about 80% to about 99%, or from about 80% to about 95%, or from about 80% to about 90%, or from about 85% to about 100%, or from about 85% to about 99%, or from about 85% to about 95%, or from about 85% to about 90%, or from about 90% to about 100%, or from about 90% to about 99%, or from about 90% to about 95%, or from about 95% to about 100%, or from about 95% to about 99%, of polytype 6 of the total ZSM-48-type material present in the product. The molecular sieve (i.e. SSZ-91) may consist substantially entirely of polytype 6.

The molecular sieve (i.e. SSZ-91) may comprise no less than about 0.1 wt. %, for example, no less than about 0.5 wt. %, or no less than about 1.0 wt. %, of the EUO-type molecular sieve phase. The molecular sieve (i.e. SSZ-91) may comprise no greater than about 5.0 wt. %, for example, no greater than about 3.5 wt. %, or no greater than about 2.5 wt. %, or no greater than about 2.0 wt. %, or no greater than about 1.5 wt. %, or no greater than about 1.0 wt. %, or no greater than about 0.5 wt. %, of the EUO-type molecular sieve phase. The molecular sieve (i.e. SSZ-91) may comprise from about 0 wt. % to about 5.0 wt. %, for example, from about 0 wt. % to about 3.5 wt. %, or from about 0 wt. % to about 2.5 wt. %, or from about 0 wt. % to about 2.0 wt. %, or from about 0 wt. % to about 1.5 wt. %, or from about 0 wt. % to about 1.0 wt. %, or from about 0 wt. % to about 0.5 wt. %, or from about 0.1 wt. % to about 7.0 wt. %, or from about 0.1 wt. % to about 5.0 wt. %, or from about 0.1 wt. % to about 3.5 wt. %, or from about 0.1 wt. % to about 3.0 wt. %, or from about 0.1 wt. % to about 2.5 wt. %, or from about 0.1 wt. % to about 2.0 wt. %, or from about 0.1 wt. % to about 1.5 wt. %, or from about 0.1 wt. % to about 1.0 wt. %, or from about 0.1 wt. % to about 0.5 wt. %, or from about 0.5 wt. % to about 7.0 wt. %, or from about 0.5 wt. % to about 5.0 wt. %, or from about 0.5 wt. % to about 3.5 wt. %, or from about 0.5 wt. % to about 3.0 wt. %, or from about 0.5 wt. % to about 2.5 wt. %, or from about 0.5 wt. % to about 2.0 wt. %, or from about 0.5 wt. % to about 1.5 wt. %, or from about 0.5 wt. % to about 1.0 wt. %, or from about 1.0 wt. % to about 7.0 wt. %, or from about 1.0 wt. % to about 5.0 wt. %, or from about 1.0 wt. % to about 3.5 wt. %, or from about 1.0 wt. % to about 3 wt. %, or from about 1.0 wt. % to about 2.5 wt. %, or from about 1.0 wt. % to about 2 wt. %, or from about 1.0 wt. % to about 1.5 wt. %, of the EUO-type molecular sieve phase.

The EUO-type molecular sieve phase may comprise (e.g. be) EU-1. The molecular sieve (i.e. SSZ-91) may comprise no less than about 0 wt. %, for example, no less than about 0.1 wt. %, or no less than about 0.5 wt. %, or no less than about 1.0 wt. %, of EU-1. The molecular sieve (i.e. SSZ-91) may comprise no greater than about 7.0 wt. %, for example, no greater than about 5.0 wt. %, or no greater than about 3.5 wt. %, or no greater than about 2.5 wt. %, or no greater than about 2.0 wt. %, or no greater than about 1.5 wt. %, or no greater than about 1.0 wt. %, or no greater than about 0.5 wt. %, of EU-1. The molecular sieve (i.e. SSZ-91) may comprise from about 0 wt. % to about 7.0 wt. %, for example, from about 0 wt. % to about 5.0 wt. %, or from about 0 wt. % to about 3.5 wt. %, or from about 0 wt. % to about 2.5 wt. %, or from about 0 wt. % to about 2.0 wt. %, or from about 0 wt. % to about 1.5 wt. %, or from about 0 wt. % to about 1.0 wt. %, or from about 0 wt. % to about 0.5 wt. %, or from about 0.1 wt. % to about 7.0 wt. %, or from about 0.1 wt. % to about 5.0 wt. %, or from about 0.1 wt. % to about 3.5 wt. %, or from about 0.1 wt. % to about 3.0 wt. %, or from about 0.1 wt. % to about 2.5 wt. %, or from about 0.1 wt. % to about 2.0 wt. %, or from about 0.1 wt. % to about 1.5 wt. %, or from about 0.1 wt. % to about 1.0 wt. %, or from about 0.1 wt. % to about 0.5 wt. %, or from about 0.5 wt. % to about 7.0 wt. %, or from about 0.5 wt. % to about 5.0 wt. %, or from about 0.5 wt. % to about 3.5 wt. %, or from about 0.5 wt. % to about 3.0 wt. %, or from about 0.5 wt. % to about 2.5 wt. %, or from about 0.5 wt. % to about 2.0 wt. %, or from about 0.5 wt. % to about 1.5 wt. %, or from about 0.5 wt. % to about 1.0 wt. %, or from about 1.0 wt. % to about 7.0 wt. %, or from about 1.0 wt. % to about 5.0 wt. %, or from about 1.0 wt. % to about 3.5 wt. %, or from about 1.0 wt. % to about 3 wt. %, or from about 1.0 wt. % to about 2.5 wt. %, or from about 1.0 wt. % to about 2 wt. %, or from about 1.0 wt. % to about 1.5 wt. %, of EU-1.

The polycrystalline aggregates of the molecular sieve (i.e. SSZ-91) may comprise crystallites collectively having an average aspect ratio of no less than about 2, for example, no less than about 3. The polycrystalline aggregates of the molecular sieve (i.e. SSZ-91) may comprise crystallites collectively having an average aspect ratio of no greater than about 7, for example, no greater than about 6, or no greater than about 5, or no greater than about 4, or no greater than about 3, or no greater than about 2. The polycrystalline aggregates of the molecular sieve (i.e. SSZ-91) may comprise crystallites collectively having an average aspect ratio from about 1 to about 7, for example, from about 1 to about 6, or from about 1 to about 5, or from about 1 to about 4, or from about 1 to about 3, or from about 1 to about 2, or from about 2 to about 8, or from about 2 to about 7, or from about 2 to about 6, or from about 2 to about 5, or from about 2 to about 4, or from about 2 to about 3, or from about 3 to about 8, or from about 3 to about 7, or from about 3 to about 6, or from about 3 to about 5, or from about 3 to about 4. The polycrystalline aggregates of the molecular sieve (i.e. SSZ-91) may comprise crystallites collectively having an average aspect ratio of about 1. SSZ-91 exhibits a lower degree of hydrocracking than those ZSM-48 materials having a higher aspect ratio. An aspect ratio of 1 is the ideal lowest value, where the length and width are the same.

The polycrystalline aggregates may (i.e. each) have a diameter no less than about 100 nm, for example, no less than about 500 nm. The polycrystalline aggregates may (i.e. each) have a diameter no greater than about 1.5 μm, for example, no greater than about 1 μm. The polycrystalline aggregates may (i.e. each) have a diameter from about 100 nm to about 1.5 μm, for example, from about 500 nm to about 1.5 μm, or from about 100 nm to about 1 μm, or from about 500 nm to about 1 μm.

It may be that the molecular sieve (i.e. SSZ-91): has a silicon oxide to aluminium oxide mole ratio of about 70 to about 160, for example about 80 to about 140; comprises at least 80%, for example at least about 90%, polytype 6 of the total ZSM-48 type material present in the product; and comprises between about 0.1 and about 2 wt. % EU-1; and that the crystallites collectively have an average aspect ratio of between about 1 and about 5, for example between about 1 and about 3.

The molecular sieve (i.e. SSZ-91) may have, in its as-synthesized form, an (i.e. powder) X-ray diffraction pattern substantially as shown in Table 1 below:

TABLE 1

Characteristic Peaks for As-Synthesized SSZ-91

| 2-Theta[(a)] | d-spacing (nm) | Relative Intensity[(b)] |
|---|---|---|
| 7.55 | 1.170 | W |
| 8.71 | 1.015 | W |
| 12.49 | 0.708 | W |
| 15.12 | 0.586 | W |
| 21.18 | 0.419 | VS |
| 22.82 | 0.390 | VS |
| 24.62 | 0.361 | W |
| 26.39 | 0.337 | W |
| 29.03 | 0.307 | W |
| 31.33 | 0.285 | W |

[(a)] ±0.20

[(b)] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The molecular sieve (i.e. SSZ-91) may have, in its calcined form, an (i.e. powder) x-ray diffraction pattern substantially as shown in Table 2 below:

TABLE 2

Characteristic Peaks for Calcined SSZ-91

| 2-Theta[(a)] | d-spacing (nm) | Relative Intensity[(b)] |
|---|---|---|
| 7.67 | 1.152 | M |
| 8.81 | 1.003 | W |
| 12.61 | 0.701 | W |
| 15.30 | 0.579 | W |
| 21.25 | 0.418 | VS |
| 23.02 | 0.386 | VS |
| 24.91 | 0.357 | W |
| 26.63 | 0.334 | W |
| 29.20 | 0.306 | W |
| 31.51 | 0.284 | W |

[(a)] ±0.20

[(b)] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

The hydroisomerization catalyst may comprise no less than about 5 wt. %, for example, no less than about 10 wt. %, or no less than about 20 wt. %, or no less than about 30 wt. %, or no less than about 40 wt. %, or no less than about 50 wt. %, of the molecular sieve based on the bulk dry weight of the hydroisomerization catalyst. The hydroisomerization catalyst may comprise no greater than about 80 wt. %, for example, no greater than about 70 wt. %, or no greater than about 60 wt. %, or no greater than about 50 wt. %, of the molecular sieve based on the bulk dry weight of the hydroisomerization catalyst. The hydroisomerization catalyst may comprise from about 5 wt. % to about 80 wt. %, for example, from about 5 wt. % to about 70 wt. %, or from about 5 wt. % to about 60 wt. %, or from about 5 wt. % to about 50 wt. %, from about 10 wt. % to about 80 wt. %, from about 10 wt. % to about 70 wt. %, or from about 10 wt. % to about 60 wt. %, or from about 10 wt. % to about 50 wt. %, from about 20 wt. % to about 80 wt. %, from about 20 wt. % to about 70 wt. %, or from about 20 wt. % to about 60 wt. %, or from about 20 wt. % to about 50 wt. %, from about 30 wt. % to about 80 wt. %, from about 30 wt. % to about 70 wt. %, or from about 30 wt. % to about 60 wt. %, or from about 30 wt. % to about 50 wt. %, from about 40 wt. % to about 80 wt. %, from about 40 wt. % to about 70 wt. %, or from about 40 wt. % to about 60 wt. %, or from about 40 wt. % to about 50 wt. %, from about 50 wt. % to about 80 wt. %, from about 50 wt. % to about 70 wt. %, or from about 50 wt. % to about 60 wt. %, of the molecular sieve based on the bulk dry weight of the hydroisomerization catalyst.

First Modifier

The hydroisomerization catalyst comprises one or more first modifiers selected from Groups 8 to 10 of the Periodic Table of Elements. The one or more first modifiers may facilitate hydrogenation/dehydrogenation reactions. The one or more first modifiers may therefore be one or more hydrogenation/dehydrogenation metals.

For the avoidance of doubt, Group 8 of the Periodic Table of Elements comprises iron (Fe), ruthenium (Ru), osmium (Os) and hassium (Hs). Group 9 of the Periodic Table of Elements comprises cobalt (Co), rhodium (Rh), iridium (Ir) and meitnerium (Mt). Group 10 of the Periodic Table of Elements comprises nickel (Ni), palladium (Pd), platinum (Pt) and darmstadtium (Ds).

In some examples, the hydroisomerization catalyst comprises only one first modifier selected from Groups 8 to 10. In other examples, the hydroisomerization catalyst comprises two or more (i.e. different) first modifiers selected from Groups 8 to 10.

In some examples, the hydroisomerization catalyst comprises one or more first modifiers selected from platinum (Pt) and palladium (Pd). For example, the hydroisomerization catalyst may comprise only one of platinum (Pt) or palladium (Pd). Alternatively, the hydroisomerization catalyst may comprise both platinum (Pt) and palladium (Pd).

The hydroisomerization catalyst may comprise no more than about 10 wt. %, for example, no more than about 8 wt. %, or no more than about 6 wt. %, or no more than about 4 wt. %, or no more than about 2 wt. %, or no more than about 1 wt. %, of the one or more first modifiers in total based on the bulk dry weight of the hydroisomerization catalyst. The hydroisomerization catalyst may comprise no less than about 0.1 wt. %, for example, no less than about 1 wt. %, or no less than about 2 wt. %, of the one or more first modifiers in total based on the bulk dry weight of the hydroisomerization catalyst. The hydroisomerization catalyst may comprise from about 0.1 wt. % to about 10 wt. %, for example, from about 0.1 wt. % to about 8 wt. %, or from about 0.1 wt. % to about 6 wt. %, or from about 0.1 wt. % to about 4 wt. %, or from about 0.1 wt. % to about 2 wt. %, or from about 0.1 wt. % to about 1 wt. %, or from about 1 wt. % to about 10 wt. %, or from about 1 wt. % to about 8 wt. %, or from about 1 wt. % to about 6 wt. %, or from about 1 wt. % to about 4 wt. %, or from about 1 wt. % to about 2 wt. %, or from about 2 wt. % to about 10 wt. %, or from about 2 wt. % to about 8 wt. %, or from about 2 wt. % to about 6 wt. %, or from about 2 wt. % to about 4 wt. %, of the one or more first modifiers in total based on the bulk dry weight of the hydroisomerization catalyst.

Second Modifiers

The hydroisomerization catalyst comprises one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd). The one or more second modifiers may effectively reduce the number of acid sites on the molecular sieve, thereby increasing (i.e. promoting) the hydroisomerization catalyst's selectivity for isomerization (for example, of n-paraffins), for example, in comparison to hydrocracking reactions. The one or more first modifiers may therefore be one or more promoter metals or one or more promoters.

In some examples, the hydroisomerization catalyst comprises only one second modifier selected from calcium (Ca), chromium (Cr), magnesium (Mg), lanthanum (La), barium (Ba), praseodymium (Pr), strontium (Sr), potassium (K) and neodymium (Nd). In other examples, the hydroisomerization catalyst comprises two or more (i.e. different) second modifiers selected from calcium (Ca), chromium (Cr), magnesium (Mg), lanthanum (La), barium (Ba), praseodymium (Pr), strontium (Sr), potassium (K) and neodymium (Nd).

In some examples, the hydroisomerization catalyst comprises magnesium (Mg) as a second modifier. In some examples, the hydroisomerization catalyst comprises magnesium (Mg) as the only second modifier.

The hydroisomerization catalyst may comprise no more than about 10 wt. %, for example, no more than about 8 wt. %, or no more than about 6 wt. %, or no more than about 4 wt. %, or no more than about 2 wt. %, or no more than about 1.5 wt. %, or no more than about 1 wt. %, of the one or more second modifiers in total based on the bulk dry weight of the hydroisomerization catalyst. The hydroisomerization catalyst may comprise no less than about 0.1 wt. %, for example, no less than about 1 wt. %, or no less than about 2 wt. %, of the one or more second modifiers in total based on the bulk dry weight of the hydroisomerization catalyst. The hydroisomerization catalyst may comprise from about 0.1 wt. % to about 10 wt. %, for example, from about 0.1 wt. % to about 8 wt. %, or from about 0.1 wt. % to about 6 wt. %, or from about 0.1 wt. % to about 4 wt. %, or from about 0.1 wt. % to about 2 wt. %, or from about 0.1 wt. % to about 1.5 wt. %, or from about 0.1 wt. % to about 1 wt. %, or from about 1 wt. % to about 10 wt. %, or from about 1 wt. % to about 8 wt. %, or from about 1 wt. % to about 6 wt. %, or from about 1 wt. % to about 4 wt. %, or from about 1 wt. % to about 2 wt. %, or from about 1 wt. % to about 1.5 wt. %, or from about 2 wt. % to about 10 wt. %, or from about 2 wt. % to about 8 wt. %, or from about 2 wt. % to about 6 wt. %, or from about 2 wt. % to about 4 wt. %, of the one or more second modifiers in total based on the bulk dry weight of the hydroisomerization catalyst.

The hydroisomerization catalyst may comprise no more than about no more than about 4 wt. %, or no more than about 2 wt. %, or no more than about 1.5 wt. %, or no more than about 1.4 wt. %, or no more than about 1 wt. %, or more than about 0.7 wt. %, or no more than about 0.5 wt. %, or no more than about 0.4 wt. %, of magnesium (Mg) as a (e.g. the only) second modifier based on the bulk dry weight of the hydroisomerization catalyst. The hydroisomerization catalyst may comprise no less than about 0.1 wt. %, for example, no less than about 0.2 wt. %, or no less than about 0.3 wt. %, or no less than about 0.4 wt. %, or no less than about 0.5 wt. %, or no less than about 0.6 wt. %, or no less than about 0.7 wt. %, or no less than about 0.8 wt. %, or no less than about 0.9 wt. %, or no less than about 1 wt. %, or no less than about 1.3 wt. %, or no less than about 1.5 wt. %, or no less than about 2 wt. %, of magnesium (Mg) as a (e.g. the only) second modifier based on the bulk dry weight of the hydroisomerization catalyst. The hydroisomerization catalyst may comprise from about 0.1 wt. % to about 4 wt. %, for example, from about 0.1 wt. % to about 2 wt. %, or from about 0.1 wt. % to about 1.5 wt. %, or from about 0.1 wt. % to about 1.4 wt. %, or from about 0.1 wt. % to about 1 wt. %, or from about 0.1 wt. % to about 0.7 wt. %, or from about 0.1 wt. % to about 0.5 wt. %, or from about 0.1 wt. % to about 0.4 wt. %, or from about 0.2 wt. % to about 4 wt. %, or from about 0.2 wt. % to about 2 wt. %, or from about 0.2 wt. % to about 1.5 wt. %, or from about 0.2 wt. % to about 1.4 wt. %, or from about 0.2 wt. % to about 1 wt. %, or from about 0.2 wt. % to about 0.7 wt. %, or from about 0.2 wt. % to about 0.5 wt. %, or from about 0.2 wt. % to about 0.4 wt. %, or from about 0.3 wt. % to about 4 wt. %, or from about 0.3 wt. % to about 2 wt. %, or from about 0.3 wt. % to about 1.5 wt. %, or from about 0.3 wt. % to about 1.4 wt. %, or from about 0.3 wt. % to about 1 wt. %, or from about 0.3 wt. % to about 0.7 wt. %, or from about 0.3 wt. % to about 0.5 wt. %, or from about 0.3 wt. % to about 0.4 wt. %, or from about 0.4 wt. % to about 4 wt. %, or from about 0.4 wt. % to about 2 wt. %, or from about 0.4 wt. % to about 1.5 wt. %, or from about 0.4 wt. % to about 1.4 wt. %, or from about 0.4 wt. % to about 1 wt. %, or from about 0.4 wt. % to about 0.7 wt. %, or from about 0.4 wt. % to about 0.5 wt. %, or from about 0.5 wt. % to about 4 wt. %, or from about 0.5 wt. % to about 2 wt. %, or from about 0.5 wt. % to about 1.5 wt. %, or from about 0.5 wt. % to about 1.4 wt. %, or from about 0.5 wt. % to about 1 wt. %, or from about 0.5 wt. % to about 0.7 wt. %, or from about 0.6 wt. % to about 4 wt. %, or from about 0.6 wt. % to about 2 wt. %, or from about 0.6 wt. % to about 1.5 wt. %, or from about 0.6 wt. % to about 1.4 wt. %, or from about 0.6 wt. % to about 1 wt. %, or from about 0.6 wt. % to about 0.7 wt. %, or from about 0.7 wt. % to about 4 wt. %, or from about 0.7 wt. % to about 2 wt. %, or from about 0.7 wt. % to about 1.5 wt. %, or from about 0.7 wt. % to about 1.4 wt. %, or from about 0.7 wt. % to about 1 wt. %, or from about 0.8 wt. % to about 4 wt. %, or from about 0.8 wt. % to about 2 wt. %, or from about 0.8 wt. % to about 1.5 wt. %, or from about 0.8 wt. % to about 1.4 wt. %, or from about 0.8 wt. % to about 1 wt. %, or from about 0.9 wt. % to about 4 wt. %, or from about 0.9 wt. % to about 2 wt. %, or from about 0.9 wt. % to about 1.5 wt. %, or from about 0.9 wt. % to about 1.4 wt. %, or from about 0.9 wt. % to about 1 wt. %, or from about 1 wt. % to about 4 wt. %, or from about 1 wt. % to about 2 wt. %, or from about 1 wt. % to about 1.5 wt. %, or from about 1 wt. % to about 1.4 wt. %, or from about 1.3 wt. % to about 4 wt. %, or from about 1.3 wt. % to about 2 wt. %, or from about 1.3 wt. % to about 1.5 wt. %, or from about 1.3 wt. % to about 1.4 wt. %, or from about 1.5 wt. % to about 4 wt. %, or from about 1.5 wt. % to about 2 wt. %, or from about 2 wt. % to about 4 wt. %, of magnesium (Mg) as a (e.g. the only) second modifier based on the bulk dry weight of the hydroisomerization catalyst.

Support

The hydroisomerization catalyst comprises an inorganic oxide support. The inorganic oxide support may also be known as a binder.

The inorganic oxide support may be a refractory inorganic oxide support.

The inorganic oxide support may comprise alumina, silica, silica-alumina, titania, magnesia, zirconia, silica-magnesia, silica-titania, or the like, or combinations thereof. The inorganic oxide support may be amorphous, crystalline, or a combination thereof. Examples of amorphous materials include amorphous alumina, amorphous silica and amorphous silica-alumina, or the like.

In examples in which the inorganic oxide support comprises silica and alumina, the distribution of silica and alumina in the inorganic oxide support may be homogeneous or heterogeneous. In some examples, the inorganic oxide support may consist of an alumina gel in which silica, silica/alumina and/or an alumina base material is dispersed.

The inorganic oxide support may comprise materials other than alumina or silica, such as, for example, inorganic oxide or clay particles.

In some examples, silica and/or alumina constitutes no less than about 80 wt. %, for example, no less than about 90 wt. %, or no less than about 95 wt. %, of the inorganic oxide support. In some examples, the inorganic oxide support consists substantially entirely of silica and/or alumina, for example, substantially entirely of silica or substantially entirely of alumina.

The hydroisomerization catalyst may comprise no less than about 5 wt. %, for example, no less than about 10 wt. %, or no less than about 20 wt. %, or no less than about 30 wt. %, or no less than about 40 wt. %, or no less than about 50 wt. %, of the inorganic oxide support based on the bulk dry weight of the hydroisomerization catalyst. The hydroisomerization catalyst may comprise no greater than about 80 wt. %, for example, no greater than about 70 wt. %, or no greater than about 60 wt. %, or no greater than about 50 wt. %, of the inorganic oxide support based on the bulk dry weight of the hydroisomerization catalyst. The hydroisomerization catalyst may comprise from about 5 wt. % to about 80 wt. %, for example, from about 5 wt. % to about 70 wt. %, or from about 5 wt. % to about 60 wt. %, or from about 5 wt. % to about 50 wt. %, from about 10 wt. % to about 80 wt. %, from about 10 wt. % to about 70 wt. %, or from about 10 wt. % to about 60 wt. %, or from about 10 wt. % to about 50 wt. %, from about 20 wt. % to about 80 wt. %, from about 20 wt. % to about 70 wt. %, or from about 20 wt. % to about 60 wt. %, or from about 20 wt. % to about 50 wt. %, from about 30 wt. % to about 80 wt. %, from about 30 wt. % to about 70 wt. %, or from about 30 wt. % to about 60 wt. %, or from about 30 wt. % to about 50 wt. %, from about 40 wt. % to about 80 wt. %, from about 40 wt. % to about 70 wt. %, or from about 40 wt. % to about 60 wt. %, or from about 40 wt. % to about 50 wt. %, from about 50 wt. % to about 80 wt. %, from about 50 wt. % to about 70 wt. %, or from about 50 wt. % to about 60 wt. %, of the inorganic oxide support based on the bulk dry weight of the hydroisomerization catalyst.

Catalyst Composition

In some examples, the hydroisomerization catalyst comprises (e.g. consists of): from about 5 wt. % to about 80 wt. %, for example, from about 5 wt. % to about 70 wt. %, or from about 5 wt. % to about 60 wt. %, or from about 5 wt. % to about 50 wt. %, from about 10 wt. % to about 80 wt. %, from about 10 wt. % to about 70 wt. %, or from about 10 wt. % to about 60 wt. %, or from about 10 wt. % to about 50 wt. %, from about 20 wt. % to about 80 wt. %, from about 20 wt. % to about 70 wt. %, or from about 20 wt. % to about 60 wt. %, or from about 20 wt. % to about 50 wt. %, from about 30 wt. % to about 80 wt. %, from about 30 wt. % to about 70 wt. %, or from about 30 wt. % to about 60 wt. %, or from about 30 wt. % to about 50 wt. %, from about 40 wt. % to about 80 wt. %, from about 40 wt. % to about 70 wt. %, or from about 40 wt. % to about 60 wt. %, or from about 40 wt. % to about 50 wt. %, from about 50 wt. % to about 80 wt. %, from about 50 wt. % to about 70 wt. %, or from about 50 wt. % to about 60 wt. %, of the molecular sieve based on the bulk dry weight of the hydroisomerization catalyst; from about 5 wt. % to about 80 wt. %, for example, from about 5 wt. % to about 70 wt. %, or from about 5 wt. % to about 60 wt. %, or from about 5 wt. % to about 50 wt. %, from about 10 wt. % to about 80 wt. %, from about 10 wt. % to about 70 wt. %, or from about 10 wt. % to about 60 wt. %, or from about 10 wt. % to about 50 wt. %, from about 20 wt. % to about 80 wt. %, from about 20 wt. % to about 70 wt. %, or from about 20 wt. % to about 60 wt. %, or from about 20 wt. % to about 50 wt. %, from about 30 wt. % to about 80 wt. %, from about 30 wt. % to about 70 wt. %, or from about 30 wt. % to about 60 wt. %, or from about 30 wt. % to about 50 wt. %, from about 40 wt. % to about 80 wt. %, from about 40 wt. % to about 70 wt. %, or from about 40 wt. % to about 60 wt. %, or from about 40 wt. % to about 50 wt. %, from about 50 wt. % to about 80 wt. %, from about 50 wt. % to about 70 wt. %, or from about 50 wt. % to about 60 wt. %, of the inorganic oxide support based on the bulk dry weight of the hydroisomerization catalyst; from about 0.1 wt. % to about 10 wt. %, for example, from about 0.1 wt. % to about 8 wt. %, or from about 0.1 wt. % to about 6 wt. %, or from about 0.1 wt. % to about 4 wt. %, or from about 0.1 wt. % to about 2 wt. %, or from about 0.1 wt. % to about 1 wt. %, or from about 1 wt. % to about 10 wt. %, or from about 1 wt. % to about 8 wt. %, or from about 1 wt. % to about 6 wt. %, or from about 1 wt. % to about 4 wt. %, or from about 1 wt. % to about 2 wt. %, or from about 2 wt. % to about 10 wt. %, or from about 2 wt. % to about 8 wt. %, or from about 2 wt. % to about 6 wt. %, or from about 2 wt. % to about 4 wt. %, of the one or more first modifiers in total based on the bulk dry weight of the hydroisomerization catalyst; and from about 0.1 wt. % to about 10 wt. %, for example, from about 0.1 wt. % to about 8 wt. %, or from about 0.1 wt. % to about 6 wt. %, or from about 0.1 wt. % to about 4 wt. %, or from about 0.1 wt. % to about 2 wt. %, or from about 0.1 wt. % to about 1.5 wt. %, or from about 0.1 wt. % to about 1 wt. %, or from about 1 wt. % to about 10 wt. %, or from about 1 wt. % to about 8 wt. %, or from about 1 wt. % to about 6 wt. %, or from about 1 wt. % to about 4 wt. %, or from about 1 wt. % to about 2 wt. %, or from about 1 wt. % to about 1.5 wt. %, or from about 2 wt. % to about 10 wt. %, or from about 2 wt. % to about 8 wt. %, or from about 2 wt. % to about 6 wt. %, or from about 2 wt. % to about 4 wt. %, of the one or more second modifiers in total based on the bulk dry weight of the hydroisomerization catalyst.

In some examples, the hydroisomerization catalyst comprises (e.g. consists of): from about 5 wt. % to about 80 wt. %, for example, from about 5 wt. % to about 70 wt. %, or from about 5 wt. % to about 60 wt. %, or from about 5 wt. % to about 50 wt. %, from about 10 wt. % to about 80 wt. %, from about 10 wt. % to about 70 wt. %, or from about 10 wt. % to about 60 wt. %, or from about 10 wt. % to about 50 wt. %, from about 20 wt. % to about 80 wt. %, from about 20 wt. % to about 70 wt. %, or from about 20 wt. % to about 60 wt. %, or from about 20 wt. % to about 50 wt. %, from about 30 wt. % to about 80 wt. %, from about 30 wt. % to about 70 wt. %, or from about 30 wt. % to about 60 wt. %, or from about 30 wt. % to about 50 wt. %, from about 40 wt. % to about 80 wt. %, from about 40 wt. % to about 70 wt. %, or from about 40 wt. % to about 60 wt. %, or from about 40 wt. % to about 50 wt. %, from about 50 wt. % to about 80 wt. %, from about 50 wt. % to about 70 wt. %, or from about 50 wt. % to about 60 wt. %, of the molecular sieve based on the bulk dry weight of the hydroisomerization catalyst; from about 5 wt. % to about 80 wt. %, for example, from about 5 wt. % to about 70 wt. %, or from about 5 wt. % to about 60 wt. %, or from about 5 wt. % to about 50 wt. %, from about 10 wt. % to about 80 wt. %, from about 10 wt. % to about 70 wt. %, or from about 10 wt. % to about 60 wt. %, or from about 10 wt. % to about 50 wt. %, from about 20 wt. % to about 80 wt. %, from about 20 wt. % to about 70 wt. %, or from about 20 wt. % to about 60 wt. %, or from about 20 wt. % to about 50 wt. %, from about 30 wt. % to about 80 wt. %, from about 30 wt. % to about 70 wt. %, or from about 30 wt. % to about 60 wt. %, or from about 30 wt. % to about 50 wt. %, from about 40 wt. % to about 80 wt. %, from about 40 wt. % to about 70 wt. %, or from about 40 wt. % to about 60 wt. %, or from about 40 wt. % to about 50 wt. %, from about 50 wt. % to about 80 wt. %, from about 50 wt. % to about 70 wt. %, or from about 50 wt. % to about 60 wt. %, of the inorganic oxide support based on the bulk dry weight of the hydroisomerization catalyst; from about 0.1 wt. % to about 10 wt. %, for example, from about 0.1 wt. % to about 8 wt. %, or from about 0.1 wt. % to about 6 wt. %, or from about 0.1 wt. % to about 4 wt. %, or from about 0.1 wt. % to about 2 wt. %, or from about 0.1 wt. % to about 1 wt. %, or from about 1 wt. % to about 10 wt. %, or from about 1 wt. % to about 8 wt. %, or from about 1 wt. % to about 6 wt. %, or from about 1 wt. % to about 4 wt. %, or from about 1 wt. % to about 2 wt. %, or from about 2 wt. % to about 10 wt. %, or from about 2 wt. % to about 8 wt. %, or from about 2 wt. % to about 6 wt. %, or from about 2 wt. % to about 4 wt. %, of the one or more first modifiers in total based on the bulk dry weight of the hydroisomerization catalyst; and from about 0.1 wt. % to about 4 wt. %, for example, from about 0.1 wt. % to about 2 wt. %, or from about 0.1 wt. % to about 1.5 wt. %, or from about 0.1 wt. % to about 1.4 wt. %, or from about 0.1 wt. % to about 1 wt. %, or from about 0.1 wt. % to about 0.7 wt. %, or from about 0.1 wt. % to about 0.5 wt. %, or from about 0.1 wt. % to about 0.4 wt. %, 0.2 wt. % to about 4 wt. %, or from about 0.2 wt. % to about 2 wt. %, or from about 0.2 wt. % to about 1.5 wt. %, or from about 0.2 wt. % to about 1.4 wt. %, or from about 0.2 wt. % to about 1 wt. %, or from about 0.2 wt. % to about 0.7 wt. %, or from about 0.2 wt. % to about 0.5 wt. %, or from about 0.2 wt. % to about 0.4 wt. %, or from about 0.3 wt. % to about 4 wt. %, or from about 0.3 wt. % to about 2 wt. %, or from about 0.3 wt. % to about 1.5 wt. %, or from about 0.3 wt. % to about 1.4 wt. %, or from about 0.3 wt. % to about 1 wt. %, or from about 0.3 wt. % to about 0.7 wt. %, or from about 0.3 wt. % to about 0.5 wt. %, or from about 0.3 wt. % to about 0.4 wt. %, or from about 0.4 wt. % to about 4 wt. %, or from about 0.4 wt. % to about 2 wt. %, or from about 0.4 wt. % to about 1.5 wt.

%, or from about 0.4 wt. % to about 1.4 wt. %, or from about 0.4 wt. % to about 1 wt. %, or from about 0.4 wt. % to about 0.7 wt. %, or from about 0.4 wt. % to about 0.5 wt. %, or from about 0.5 wt. % to about 4 wt. %, or from about 0.5 wt. % to about 2 wt. %, or from about 0.5 wt. % to about 1.5 wt. %, or from about 0.5 wt. % to about 1.4 wt. %, or from about 0.5 wt. % to about 1 wt. %, or from about 0.5 wt. % to about 0.7 wt. %, or from about 0.6 wt. % to about 4 wt. %, or from about 0.6 wt. % to about 2 wt. %, or from about 0.6 wt. % to about 1.5 wt. %, or from about 0.6 wt. % to about 1.4 wt. %, or from about 0.6 wt. % to about 1 wt. %, or from about 0.6 wt. % to about 0.7 wt. %, or from about 0.7 wt. % to about 4 wt. %, or from about 0.7 wt. % to about 2 wt. %, or from about 0.7 wt. % to about 1.5 wt. %, or from about 0.7 wt. % to about 1.4 wt. %, or from about 0.7 wt. % to about 1 wt. %, or from about 0.8 wt. % to about 4 wt. %, or from about 0.8 wt. % to about 2 wt. %, or from about 0.8 wt. % to about 1.5 wt. %, or from about 0.8 wt. % to about 1.4 wt. %, or from about 0.8 wt. % to about 1 wt. %, or from about 0.9 wt. % to about 4 wt. %, or from about 0.9 wt. % to about 2 wt. %, or from about 0.9 wt. % to about 1.5 wt. %, or from about 0.9 wt. % to about 1.4 wt. %, or from about 0.9 wt. % to about 1 wt. %, or from about 1 wt. % to about 4 wt. %, or from about 1 wt. % to about 2 wt. %, or from about 1 wt. % to about 1.5 wt. %, or from about 1 wt. % to about 1.4 wt. %, or from about 1.3 wt. % to about 4 wt. %, or from about 1.3 wt. % to about 2 wt. %, or from about 1.3 wt. % to about 1.5 wt. %, or from about 1.3 wt. % to about 1.4 wt. %, or from about 1.5 wt. % to about 4 wt. %, or from about 1.5 wt. % to about 2 wt. %, or from about 2 wt. % to about 4 wt. %, of magnesium (Mg) as a (e.g. the only) second modifier based on the bulk dry weight of the hydroisomerization catalyst.

In some examples, the hydroisomerization catalyst comprises (e.g. consists of): from about 5 wt. % to about 80 wt. %, for example, from about 20 wt. % to about 70 wt. %, of the molecular sieve based on the bulk dry weight of the hydroisomerization catalyst; from about 5 wt. % to about 80 wt. %, for example, from about 20 wt. % to about 70 wt. %, of the inorganic oxide support based on the bulk dry weight of the hydroisomerization catalyst; no more than about 10 wt. %, for example, from about 0.1 wt. % to about 10 wt. %, or from about 0.1 wt. % to about 2 wt. %, of the one or more first modifiers in total based on the bulk dry weight of the hydroisomerization catalyst; and no more than about 10 wt. %, for example, from about 0.1 wt. % to about 10 wt. %, or from about 0.1 wt. % to about 2 wt. %, of the one or more second modifiers in total based on the bulk dry weight of the hydroisomerization catalyst.

In some examples, the hydroisomerization catalyst comprises (e.g. consists of): from about 5 wt. % to about 80 wt. %, for example, from about 20 wt. % to about 70 wt. %, of the molecular sieve based on the bulk dry weight of the hydroisomerization catalyst; from about 5 wt. % to about 80 wt. %, for example, from about 20 wt. % to about 70 wt. %, of the inorganic oxide support based on the bulk dry weight of the hydroisomerization catalyst; no more than about 10 wt. %, for example, from about 0.1 wt. % to about 10 wt. %, or from about 0.1 wt. % to about 2 wt. %, of the one or more first modifiers in total based on the bulk dry weight of the hydroisomerization catalyst; and from about 0.1 wt. % to about 1.5 wt. % Mg based on the bulk dry weight of the hydroisomerization catalyst.

Catalyst Form

The hydroisomerization catalyst may be provided in the form of an extrudate or formed particle, for example, a calcined extrudate or formed particle. For example, the hydroisomerization catalyst may comprise a plurality of said (e.g. calcined) extrudates and/or formed particles. The (e.g. calcined) catalyst extrudates and/or formed particles may have diameters from about 0.5 mm to about 5 mm, for example, from about 1 mm to about 3 mm, or from about 1 mm to about 2 mm. The (e.g. calcined) catalyst extrudates and/or formed particles may have length/diameter ratios of from about 1 to about 5, for example, from about 1 to about 4, or from about 2 to about 5, or from about 2 to about 4, or from about to 2 to about 3.

Method of Making the Catalyst

A method of making the hydroisomerization catalyst generally comprises: forming a mixture comprising the molecular sieve belonging to the ZSM-48 family of zeolites and an inorganic oxide; extruding the mixture to form an extrudate or formed particle; drying the extrudate or formed particle; and calcining the dried extrudate or formed particle; wherein the method further comprises incorporating into the hydroisomerization catalyst one or more first modifiers selected from Groups 8 to 10 and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd).

The one or more first modifiers and/or the one or more second modifiers may be incorporated into the hydroisomerization catalyst after drying and calcining the extrudate or formed particle.

For example, incorporating into the hydroisomerization catalyst the one or more first modifiers and the one or more second modifiers may comprise loading the calcined extrudate or formed particle with the one or more first modifiers and the one or more second modifiers to form a modified calcined extrudate or formed particle by: contacting the calcined extrudate or formed particle with a first impregnation solution comprising either the one or more first modifiers or the one or more second modifiers; contacting the calcined extrudate or formed particle with a second impregnation solution comprising the corresponding other of the one or more second modifiers or the one or more first modifiers; and drying the modified calcined extrudate or formed particle. The method may further comprise calcining the modified calcined extrudate or formed particle.

The calcined extrudate or formed particle may be contacted with the first impregnation solution under sufficient impregnation conditions to impregnate the calcined extrudate or formed particle with at least about 0.1 wt. %, for example, at least about 1 wt. %, of the respective one of the one or more first modifiers or one or more second modifiers. The calcined extrudate or formed particle may be contacted with the second impregnation solution under sufficient impregnation conditions to impregnate the calcined extrudate or formed particle with at least about 0.1 wt. %, for example, at least about 1 wt. %, of the corresponding other of the one or more first modifiers or one or more second modifiers.

Alternatively, incorporating into the hydroisomerization catalyst the one or more first modifiers and the one or more second modifiers may comprise loading the calcined extrudate or formed particle with the one or more first modifiers and the one or more second modifiers to form a modified calcined extrudate or formed particle by: contacting the calcined extrudate or formed particle with a third impregnation solution comprising both the one or more first modifiers and the one or more second modifiers; and drying the modified calcined extrudate or formed particle. The method may further comprise calcining the modified calcined extrudate or formed particle.

The calcined extrudate or formed particle may be contacted with the third impregnation solution under sufficient impregnation conditions to impregnate the calcined extrudate or formed particle with at least about 0.1 wt. %, for example, at least about 1 wt. %, of the one or more first modifiers and at least about 0.1 wt. %, for example, at least about 1 wt. %, of the one or more second modifiers.

Alternatively, the one or more first modifiers and/or the one or more second modifiers may be incorporated into the hydroisomerization catalyst prior to drying and calcining the extrudate or formed particle. For example, incorporating into the hydroisomerization catalyst the one or more first modifiers and the one or more second modifiers may comprise loading the molecular sieve with the one or more first modifiers and the one or more second modifiers prior to forming the mixture. Loading the molecular sieve with the one or more first modifiers and the one or more second modifiers may comprise: contacting the molecular sieve with a fourth impregnation solution comprising either the one or more first modifiers or the one or more second modifiers; contacting the molecular sieve with a fifth impregnation solution comprising the corresponding other of the one or more second modifiers or the one or more first modifiers; and drying the modified molecular sieve. Alternatively, loading the molecular sieve with the one or more first modifiers and the one or more second modifiers may comprise: contacting the molecular sieve with a sixth impregnation solution comprising both the one or more first modifiers and the one or more second modifiers; and drying the modified molecular sieve. The molecular sieve may be contacted with the fourth, fifth or sixth impregnation solutions under sufficient impregnation conditions to impregnate the molecular sieve with at least about 0.1 wt. %, for example, at least about 1 wt. %, of the one or more first modifiers and at least about 0.1 wt. %, for example, at least about 1 wt. %, of the one or more second modifiers.

It may be that incorporating into the hydroisomerization catalyst the one or more first modifiers and the one or more second modifiers comprises loading the hydroisomerization catalyst with about 0.1 wt. % to about 4 wt. %, for example, about 0.1 wt. % to about 2 wt. %, or about 0.1 wt. % to about 1.5 wt. %, of magnesium (Mg).

The impregnation solutions may contain salts (such as halides, nitrates or sulfates) of the respective metal cation(s). The impregnation solutions may be prepared by dissolving said salts in deionized water. The concentrations of the impregnation solutions are selected based on the pore volume of the inorganic oxide support and the desired level of metal loading.

The mixture, prior to extrusion, may comprise no less than about 5 wt. %, for example, no less than about 10 wt. %, or no less than about 20 wt. %, of the molecular sieve. The mixture, prior to extrusion, may comprise no greater than about 80 wt. %, for example, no greater than about 70 wt. %, or no greater than about 60 wt. %, of the molecular sieve. The mixture, prior to extrusion, may comprise from about 5 wt. % to about 80 wt. %, for example, from about 5 wt. % to about 70 wt. %, or from about 5 wt. % to about 60 wt. %, or from about 10 wt. % to about 80 wt. %, or from about 10 wt. % to about 70 wt. %, or from about 10 wt. % to about 60 wt. %, or from about 20 wt. % to about 80 wt. %, or from about 20 wt. % to about 70 wt. %, or from about 20 wt. % to about 60 wt. %, of the molecular sieve.

The mixture, prior to extrusion, may further comprise an aqueous solution.

Drying of the extrudate or formed particle prior to impregnation may be performed at temperatures from about 194° F. to about 302° F. (about 90° C. to about 150° C.) for about 1 hour to about 12 hours. Calcination of the dried extrudate or formed particle may be performed at temperatures from about 390° F. to about 1100° F. (from about 199° C. to about 593° C.) for from about 0.5 hours to about 5 hours.

Drying of the modified extrudate or formed particle after impregnation may be performed at temperatures from about 100° F. to about 300° F. (about 38° C. to about 149° C.) for from about 0.1 hours to about 10 hours. Calcination of the modified extrudate or formed particle may be performed at temperatures from about 600° F. to about 1200° F. (from about 316° C. to about 649° C.) for from about 0.1 hours to about 10 hours.

Methods of Using the Catalyst

The hydroisomerization catalyst may be used in a method of hydroisomerizing a hydrocarbonaceous feedstock. The method typically comprises contacting the hydrocarbonaceous feedstock with the hydroisomerization catalyst in the presence of hydrogen and under hydroisomerization conditions.

The hydrocarbonaceous feedstock may comprise one or more of: gas oil; vacuum gas oil; long residue; vacuum residue; atmospheric distillate; heavy fuel; oil; wax and paraffin; used oil; deasphalted residue or crude; charges resulting from thermal or catalytic conversion processes; shale oil; cycle oil; animal and vegetable derived fats, oils and waxes; petroleum and slack wax; or any combination thereof.

The method may be a method of dewaxing the hydrocarbonaceous feedstock by hydroisomerization. Accordingly, the hydrocarbonaceous feedstock may be an unconverted oil or a base oil product.

The hydroisomerization conditions may comprise: a reaction temperature from about 500° F. to about 800° F. (from about 260° C. to about 427° C.), for example from about 550° F. to about 750° F. (from about 288° C. to about 399° C.); a reaction gauge pressure from about 350 psi to about 5000 psi (from about 2413 kPa to about 34474 kPa), for example, from about 1500 psi to about 2500 psi (from about 10342 kPa to about 17237 kPa), or from about 1200 psi to about 2500 psi from about 8274 kPa to about 17237 kPa); an liquid hourly space velocity (LHSV) from about 0.1 $hr^{-1}$ to about 15 $hr^{-1}$, for example from about 0.2 $hr^{-1}$ to about 10 $hr^{-1}$, or from about 0.2 $hr^{-1}$ to about 2.5 $hr^{-1}$, or from about 0.1 $hr^{-1}$ to about 10 hr−1; a hydrogen and combined feed fed to the reactor in a ratio from about 2000 to about 10,000 standard cubic feet $H_2$ per barrel combined feed (from about 360 to about 1800 $m^3$ $H_2/m^3$ feed); and/or a hydrogen consumption from about 100 scf to about 2500 scf per barrel of liquid hydrocarbon feed (from about 17.8 to about 445 $m^3$ $H_2/m^3$ feed), for example from about 200 scf to about 2500 scf per barrel (from about 35.6 to about 445 $m^3$ $H_2/m^3$ feed), or from about 100 scf to about 1500 scf per barrel (from about 17.8 to about 267 $m^3$ $H_2/m^3$ feed).

The hydroisomerization catalyst of the present invention may be used alone or in combination with one or more other hydroisomerization catalysts, hydrotreating catalysts and/or hydrocracking catalysts.

The inventors have found that use of the hydroisomerization catalyst according to the present invention, in comparison to hydroisomerization catalysts not containing the molecular sieve (i.e. SSZ-91) and/or the one or more second modifiers (e.g. magnesium (Mg)), in the hydroisomerization of a hydrocarbonaceous feedstock can increase the yield of a hydroisomerized effluent, increase the viscosity index of the hydroisomerized effluent, and reduce the yield of short-chain (e.g. containing 4 carbon atoms or fewer) hydrocarbons. For example, in some cases the yield of the hydroisomerised effluent, particularly a lube product yield, may be increased by at least about 0.5 wt. %, or 0.8 wt. %, or 1.0 wt. %, or 1.2 wt. %, or 1.4 wt. %, or 1.6 wt. %, or 1.8 wt. %, or 2.0 wt. %. The hydroisomerization catalyst according to the present invention may also exhibit increased selectivity for hydroisomerization in comparison to hydroisomerization catalysts not containing the molecular sieve (i.e. SSZ-91) and/or the one or more second modifiers (e.g. magnesium (Mg)). For example, in addition to or separately from the hydroisomerized effluent yield benefits, the selectivity for isomerized n-$C_{16}$ may also be increased, e.g., by at least about 2 wt. %, or 5 wt. %, or 10 wt. %.

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

For the avoidance of doubt, the present application is directed to the subject-matter described in the following numbered paragraphs:

1. A hydroisomerization catalyst comprising: a molecular sieve belonging to the ZSM-48 family of zeolites; an inorganic oxide support; one or more first modifiers selected from Groups 8 to 10; and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd); wherein the molecular sieve comprises: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product; and wherein the molecular sieve has a morphology characterized as polycrystalline aggregates comprising crystallites collectively having an average aspect ratio of between about 1 and about 8.

2. The hydroisomerization catalyst according to paragraph 1, wherein the molecular sieve has: in its as-synthesized form, an X-ray diffraction pattern substantially as shown in the following Table:

| 2-Theta[(a)] | d-spacing (nm) | Relative Intensity[(b)] |
|---|---|---|
| 7.55 | 1.170 | W |
| 8.71 | 1.015 | W |
| 12.49 | 0.708 | W |
| 15.12 | 0.586 | W |
| 21.18 | 0.419 | VS |
| 22.82 | 0.390 | VS |
| 24.62 | 0.361 | W |
| 26.39 | 0.337 | W |
| 29.03 | 0.307 | W |
| 31.33 | 0.285 | W |
| 7.67 | 1.152 | M |
| 8.81 | 1.003 | W |
| 12.61 | 0.701 | W |
| 15.30 | 0.579 | W |
| 21.25 | 0.418 | VS |
| 23.02 | 0.386 | VS |
| 24.91 | 0.357 | W |
| 26.63 | 0.334 | W |
| 29.20 | 0.306 | W |
| 31.51 | 0.284 | W |

[(a)]±0.20

[(b)]The powder XRD patterns provided are based on a relative intensity scale in which the strongest line in the X-ray pattern is assigned a value of 100: W = weak (>0 to ≤20); M =medium (>20 to ≤40); S = strong (>40 to ≤60); VS = very strong (>60 to ≤100); and/or in its calcined form, an X-ray diffraction pattern substantially as shown in the following Table:

3. The hydroisomerization catalyst according to paragraph 1 or paragraph 2, wherein: the molecular sieve has a silicon oxide to aluminium oxide mole ratio of about 70 to about 160, for example about 80 to about 140; the molecular sieve comprises at least 80%, for example at least about 90%, polytype 6 of the total ZSM-48 type material present in the product; the molecular sieve comprises between about 0.1 and about 2 wt. % EU-1; and/or the crystallites collectively have an average aspect ratio of between about 1 and about 5, for example between about 1 and about 3.

4. The hydroisomerization catalyst according to any preceding paragraph, wherein the hydroisomerization catalyst comprises from about 5 wt. % to about 80 wt. %, for example from about 20 wt. % to about 70 wt. %, of the molecular sieve based on the bulk dry weight of the hydroisomerization catalyst.

5. The hydroisomerization catalyst according to any preceding paragraph, wherein the hydroisomerization catalyst comprises no more than about 10 wt. %, for example from about 0.1 wt. % to about 10 wt. %, or from about 0.1 wt. % to about 2 wt. %, of the one or more second modifiers in total based on the bulk dry weight of the hydroisomerization catalyst.

6. The hydroisomerization catalyst according to any preceding paragraph, wherein the hydroisomerization catalyst comprises no more than about 10 wt. %, for example from about 0.1 wt. % to about 10 wt. %, or from about 0.1 wt. % to about 2 wt. %, of the one or more first modifiers in total based on the bulk dry weight of the hydroisomerization catalyst.

7. The hydroisomerization catalyst according to any preceding paragraph, wherein the hydroisomerization catalyst comprises from about 0.1 wt. % to about 1.5 wt. % Mg.

8. The hydroisomerization catalyst according to any preceding paragraph, wherein the hydroisomerization catalyst is provided in the form of a calcined extrudate or formed particle.

9. A method of making a hydroisomerization catalyst, the method comprising: forming a mixture comprising a molecular sieve belonging to the ZSM-48 family of zeolites and an inorganic oxide, wherein the molecular sieve: comprises: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product; and has a morphology characterized as polycrystalline aggregates comprising crystallites collectively having an average aspect ratio of between about 1 and about 8; extruding the mixture to form an extrudate or formed particle; drying the extrudate or formed particle; and calcining the dried extrudate or formed particle; wherein the method further comprises incorporating into the hydroisomerization catalyst one or more first modifiers selected from Groups 8 to 10 and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd).

10. The method according to paragraph 9, wherein incorporating into the hydroisomerization catalyst the one or more first modifiers and the one or more second modifiers comprises loading the calcined extrudate or formed particle with the one or more first modifiers and/or the one or more second modifiers to form a modified calcined extrudate or formed particle by: contacting the calcined extrudate or formed particle with a first impregnation solution comprising either the one or more first modifiers or the one or more second modifiers, optionally under sufficient impregnation conditions to impregnate the calcined extrudate or formed particle with at least about 0.1 wt. % of the respective one or more first modifiers or one or more second modifiers; and contacting the calcined extrudate or formed particle with a second impregnation solution comprising the corresponding other of the one or more second modifiers or the one or more first modifiers, optionally under sufficient impregnation conditions to impregnate the calcined extrudate or formed particle with at least about 0.1 wt. % of the respective one or more second modifiers or one or more first modifiers; or contacting the calcined extrudate or formed particle with a third impregnation solution comprising both the one or more first modifiers and the one or more second modifiers, optionally under sufficient impregnation conditions to impregnate the calcined extrudate or formed particle with at least about 0.1 wt. % of the one or more first modifiers and at least about 0.1 wt. % the one or more second modifiers; and drying the modified calcined extrudate or formed particle.

11. The method according to paragraph 9, wherein incorporating into the hydroisomerization catalyst the one or more first modifiers and the one or more second modifiers comprises loading the molecular sieve with the one or more first modifiers and the one or more second modifiers prior to forming the mixture, optionally under sufficient conditions to load the molecule sieve with at least about 0.1 wt. % of the one or more first modifiers and at least about 0.1 wt. % the one or more second modifiers.

12. The method according to any of paragraphs 9 to 11, wherein incorporating into the hydroisomerization catalyst the one or more first modifiers and the one or more second modifiers comprises loading the hydroisomerization catalyst with about 0.1 wt. % to about 1.5 wt. % Mg.

13. The method according to any of paragraphs 9 to 11, wherein: the molecular sieve has a silicon oxide to aluminium oxide mole ratio of about 70 to about 160, for example about 80 to about 140; the molecular sieve comprises at least 80%, for example at least about 90%, polytype 6 of the total ZSM-48 type material present in the product; the molecular sieve comprises between about 0.1 and about 2 wt. % EU-1; and/or the crystallites collectively have an average aspect ratio of between about 1 and about 5, for example between about 1 and about 3.

14. The method according to any of paragraphs 9 to 13, wherein the mixture comprises from about 5 wt. % to about 80 wt. % of the molecular sieve.

15. A hydroisomerization catalyst manufactured by the method according to any of paragraphs 9 to 14.

16. A method of hydroisomerizing a hydrocarbonaceous feedstock, the method comprising contacting the hydrocarbonaceous feedstock with a hydroisomerization catalyst according to any of paragraphs 1 to 8 or 15 under hydroisomerization conditions to produce a hydroisomerized effluent.

17. The method according to paragraph 16, wherein the hydrocarbonaceous feedstock comprises one or more of: gas oil; vacuum gas oil; long residue; vacuum residue; atmospheric distillate; heavy fuel; oil; wax and paraffin; used oil; deasphalted residue or crude; charges resulting from thermal or catalytic conversion processes; shale oil; cycle oil; animal and vegetable derived fats, oils and waxes; petroleum and slack wax; or any combination thereof.

18. The method according to paragraph 16, wherein the method is a method of dewaxing the hydrocarbonaceous feedstock by hydroisomerization.

19. The method according to paragraph 18, wherein the hydrocarbonaceous feedstock is an unconverted oil or a base oil product.

20. The method according to any of paragraphs 16 to 18, wherein the hydroisomerization conditions comprise: a reaction temperature from about 400° F. to about 950° F. (from about 204° C. to about 510° C.), for example, from about 650° F. to about 850° F. (from about 343° C. to about 454° C.); a reaction gauge pressure from about 500 psi to about 5000 psi (from about 3447 kPa to about 34474 kPa), for example, from about 1500 psi to about 2500 psi (from about 10342 kPa to about 17237 kPa), or from about 1200 psi to about 2500 psi from about 8274 kPa to about 17237 kPa); an LHSV from about 0.1 $hr^{-1}$ to about 15 $hr^{-1}$, for example from about 0.2 $hr^{-1}$ to about 10 $hr^{-1}$, or from about 0.2 $hr^{-1}$ to about 2.5 $hr^{-1}$, or from about 0.1 $hr^{-1}$ to about 10 $hr^{-1}$; and/or a hydrogen consumption from about 100 scf to about 2500 scf per barrel of liquid hydrocarbon feed (from about 17.8 to about 445 $m^3$ $H_2/m^3$ feed), for example from about 200 scf to about 2500 scf per barrel (from about 35.6 to about 445 $m^3$ $H_2/m^3$ feed), or from about 100 scf to about 1500 scf per barrel (from about 17.8 to about 267 $m^3$ $H_2/m^3$ feed).

21. Use of a molecular sieve in a hydroisomerization catalyst to: increase the yield of a hydroisomerized effluent; increase the viscosity index of the hydroisomerized effluent; increase the selectivity of the hydroisomerization catalyst for hydroisomerization; and/or reduce the yield of short-chain hydrocarbons, when the hydroisomerization catalyst is used in the hydroisomerization of a hydrocarbonaceous feedstock, wherein the molecular sieve: belongs to the ZSM-48 family of zeolites; comprises: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product; and has a morphology characterized as polycrystalline aggregates comprising crystallites collectively having an average aspect ratio of between about 1 and about 8; and wherein the hydroisomerization catalyst further comprises: an inorganic oxide support; one or more first modifiers selected from Groups 8 to 10; and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd).

22. The use according to paragraph 21, wherein: the molecular sieve has a silicon oxide to aluminium oxide mole ratio of about 70 to about 160, for example, about 80 to about 140; the molecular sieve comprises at least 80%, for example, at least about 90%, polytype 6 of the total ZSM-48 type material present in the product; the molecular sieve comprises between about 0.1 and about 2 wt. % EU-1; and/or the crystallites collectively have an average aspect ratio of between about 1 and about 5, for example between about 1 and about 3.

23. The use according to paragraph 21 or paragraph 22, wherein the hydroisomerization catalyst comprises: from about 5 wt. % to about 80 wt. %, for example, from about 20 wt. % to about 70 wt. %, of the molecular sieve based on the bulk dry weight of the hydroisomerization catalyst; no more than about 10 wt. %, for example, from about 0.1 wt. % to about 10 wt. %, or from about 0.1 wt. % to about 2 wt. %, of the one or more first modifiers in total based on the bulk dry weight of the hydroisomerization catalyst; and/or no more than about 10 wt. %, for example, from about 0.1 wt. % to about 10 wt. %, or from about 0.1 wt. % to about 2 wt. %, of the one or more second modifiers in total based on the bulk dry weight of the hydroisomerization catalyst, for example, wherein the hydroisomerization catalyst comprises from about 0.1 wt. % to about 1.5 wt. % Mg in total based on the bulk dry weight of the hydroisomerization catalyst.

24. Use of one or more modifiers, selected from the group consisting of calcium (Ca), chromium (Cr), magnesium (Mg), lanthanum (La), barium (Ba), praseodymium (Pr), strontium (Sr), potassium (K) and neodymium (Nd), in a hydroisomerization catalyst to: increase the yield of a hydroisomerized effluent; increase the viscosity index of the hydroisomerized effluent; increase the selectivity of the hydroisomerization catalyst for hydroisomerization; and/or reduce the yield of short-chain hydrocarbons, when the hydroisomerization catalyst is used in the hydroisomerization of a hydrocarbonaceous feedstock, wherein the hydroisomerization catalyst further comprises: a molecular sieve belonging to the ZSM-48 family of zeolites, the molecular sieve: comprising: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product; and having a morphology characterized as polycrystalline aggregates comprising crystallites collectively having an average aspect ratio of between about 1 and about 8; an inorganic oxide support; and one or more metals selected from Groups 8 to 10.

25. The use according to paragraph 24, wherein: the molecular sieve has a silicon oxide to aluminium oxide mole ratio of about 70 to about 160, for example about 80 to about 140; the molecular sieve comprises at least 80%, for example at least about 90%, polytype 6 of the total ZSM-48 type material present in the product; the molecular sieve comprises between about 0.1 and about 2 wt. % EU-1; and/or the crystallites collectively have an average aspect ratio of between about 1 and about 5, for example between about 1 and about 3.

26. The use according to paragraph 24 or paragraph 25, wherein the hydroisomerization catalyst comprises: from about 5 wt. % to about 80 wt. %, for example from about 20 wt. % to about 70 wt. %, of the molecular sieve based on the bulk dry weight of the hydroisomerization catalyst; no more than about 10 wt. %, for example from about 0.1 wt. % to about 10 wt. %, or from about 0.1 wt. % to about 2 wt. %, of the one or more first modifiers in total based on the bulk dry weight of the hydroisomerization catalyst; and/or no more than about 10 wt. %, for example from about 0.1 wt. % to about 10 wt. %, or from about 0.1 wt. % to about 2 wt. %, of the one or more second modifiers in total based on the bulk dry weight of the hydroisomerization catalyst, for example, wherein the hydroisomerization catalyst comprises from about 0.1 wt. % to about 1.5 wt. % Mg in total based on the bulk dry weight of the hydroisomerization catalyst.

EXAMPLES

The following illustrative examples are intended to be non-limiting.

SSZ-91 was prepared for all catalysts in accordance with U.S. Pat. No. 9,920,260 (incorporated herein by reference) and as described in U.S. patent application Ser. No. 17/138,260.

Example 1—Preparation and Hydroisomerisation Performance of Catalysts 1-4

Catalyst 1 (free of second modifier) was made by the following procedure: SSZ-91 molecular sieve was mixed with alumina and an aqueous solution to form a mixture having a molecular sieve content of 65 wt. % SSZ-91. The mixture was extruded to form an extrudate. The extrudate was dried and then calcined to form an extrudate base. The extrudate base was impregnated with a solution containing platinum. The impregnated catalyst was then dried in air before being calcined to provide the hydroisomerisation catalyst. The overall platinum loading of the hydroisomerisation catalyst product was 0.6 wt. %.

Catalysts 2, 3, and 4 (containing Mg second modifier) were made by the following procedure: Each of catalysts 2, 3, and 4 was loaded with Mg by contacting the calcined extrudate prepared according to the same procedure used for catalyst 1 with an impregnation solution containing Mg, and drying the extrudate. Each of the extrudates was subsequently loaded with platinum by contacting the extrudate loaded with an impregnation solution containing platinum and drying the extrudate. Finally, the extrudate was calcined to form a finished, bound hydroisomerization catalyst. The overall platinum loading of the hydroisomerisation catalyst product was 0.6 wt. %.

Catalysts 1, 2, 3 and 4 are distinguished from one another by the amount of Mg loading, as set out in Table 3.

TABLE 3

| | Catalyst 1 | Catalyst 2 | Catalyst 3 | Catalyst 4 |
|---|---|---|---|---|
| Mg, wt. % | 0 | 0.3 | 0.6 | 0.9 |

Catalysts 1, 2, 3 and 4 were used to hydroisomerize a light neutral vacuum gas oil (VGO) hydrocrackate feedstock having the properties outlined in Tables 4 and 5, by the method described in U.S. patent application Ser. No. 14/862,358 (published as US 2016/0089666A1), hereby incorporated by reference in its entirety. The reaction was performed in a micro unit equipped with two fix bed reactors. The run was operated under 2100 psig total pressure. Prior to the introduction of the feed, the catalysts were activated by a standard reduction procedure. The feed was passed through the hydroisomerization reactor at a liquid hour space velocity (LHSV) of 2 $hr^{-1}$, and then was hydrofinished in the second reactor as described in U.S. Pat. No. 8,790,507B2 (hereby incorporated by reference in its entirety), which was loaded with a Pd/Pt catalyst to further improve the lube product quality. The hydrogen to oil ratio was about 3000 scfb. The lube product was separated from fuels through the distillation section. The lube oil yield, catalyst temperature and viscosity index (VI), as measured according to ASTM D-2270) of the products was determined. Table 6 describes the lube oil product yield, the CAT and VI for the catalysts 2, 3 and 4 relative to the results obtained using catalyst 1.

TABLE 4

| Properties | Feedstock |
|---|---|
| Gravity, ° API | 34 |
| S, wt. % | 6 |
| VI at 100° C., (cSt) | 3.92 |
| VI at 70° C., (cSt) | 7.31 |
| Wax, wt. % | 12.9 |
| Dewaxed Oil VI | 101 |
| Dewaxed Oil Viscosity @ 100° C., cSt | 4.08 |
| DWO Viscosity @ 100° C., cSt | 20.1 |

TABLE 5

| Distillation fraction, wt. % | Distillation Temperature, ° F. (° C.) |
|---|---|
| 0.5 | 536 (280) |
| 5 | 639 (337) |
| 10 | 674 (357) |
| 30 | 735 (391) |
| 50 | 769 (409) |
| 70 | 801 (427) |
| 90 | 849 (454) |
| 95 | 871 (466) |
| 99.5 | 910 (488) |

TABLE 6

| | Lube yield, wt. % | Catalyst Temperature, ° F. | VI |
|---|---|---|---|
| Catalyst 1 | — | — | — |
| Catalyst 2 | +1.9 | +9 | +1 |
| Catalyst 3 | +2.1 | +16 | +1 |
| Catalyst 4 | +1.5 | +20 | +5 |

Example 2—Preparation and Hydroisomerisation Performance of Catalysts 5-8

Catalysts 5, 6, 7 and 8 were prepared by the following methods: Catalyst 5 was made by palladium ion-exchange carried out on an ammonium exchanged SSZ-91 sample using palladiumtetraamine dinitrate (0.5 wt % Pd). This palladium-exchanged sample was dried and then calcined in air to convert the palladium-tetraamine dinitrate to palladium oxide. Each of catalysts 6, 7, and 8 was made using the same procedure as described for Catalyst 5 except that the sample was first loaded with Mg by impregnating with magnesium nitrate solution followed by drying and calcining to loading Pd.

Each of the catalysts was then mixed with alumina and an aqueous solution to form a mixture having a molecular sieve content of 65 wt. % SSZ-91. The mixture was extruded to form an extrudate. The extrudate was dried and then calcined to form a finished, bound hydroisomerization catalyst. The overall palladium loading of the hydroisomerisation catalyst product was 0.6 wt. %.

Catalysts 5, 6, 7 and 8 are distinguished from one another by the amount of Mg loading, as set out in Table 7.

TABLE 7

| | Catalyst 5 | Catalyst 6 | Catalyst 7 | Catalyst 8 |
|---|---|---|---|---|
| Mg, wt. % | 0 | 0.46 | 0.92 | 1.38 |

Catalysts 5, 6, 7 and 8 were used in an n-$C_{16}$ (n-hexadecane) model compound isomerization test as described in U.S. Pat. No. 5,282,958, hereby incorporated by reference in its entirety. Reactions were run under isothermal conditions to remove temperature effects. Conversion could be adjusted with changes in space velocity. All materials were first reduced in flowing hydrogen at 630° F. for 2 hours. Once the run was begun the conditions were to use 0.50 grams of catalyst loaded packed into a downflow reactor. The hydrogen pressure was 1200 psig, flowing at 160 ml/min. For each of catalysts 6, 7, and 8, the selectivity for isomerized n-$C_{16}$, the catalyst temperature and yield of C4 was measured relative to the results for catalyst 5. The results are provided in Table 8.

TABLE 8

| | Selectivity, wt. % | Catalyst Temperature, ° F. | $C_4$, wt. % |
|---|---|---|---|
| Catalyst 5 | — | — | — |
| Catalyst 6 | +8.5 | +13 | −0.9 |
| Catalyst 7 | +10.4 | +18 | −1.0 |
| Catalyst 8 | +12.0 | +26 | −1.3 |

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

For the purposes of U.S. patent practice, and in other patent offices where permitted, all patents and publications cited in the foregoing description of the invention are incorporated herein by reference to the extent that any information contained therein is consistent with and/or supplements the foregoing disclosure.

What is claimed is:

1. A method of making a hydroisomerization catalyst, the method comprising: forming a mixture comprising a molecular sieve belonging to the ZSM-48 family of zeolites and an inorganic oxide, wherein the molecular sieve comprises: a silicon oxide to aluminum oxide mole ratio of about 40 to about 220; at least about 70% polytype 6 of the total ZSM-48-type material present in the product; and an additional EUO-type molecular sieve phase in an amount of between about 0 and about 7.0 percent by weight of the total product; and has a morphology characterized as polycrystalline aggregates comprising crystallites collectively having an average aspect ratio of between about 1 and about 8; extruding the mixture to form an extrudate or formed particle; drying the extrudate or formed particle; and calcining the dried extrudate or formed particle; wherein the method further comprises incorporating into the hydroisomerization catalyst one or more first modifiers selected from Groups 8 to 10 and one or more second modifiers selected from the group consisting of calcium (Ca), chromium (Cr), magnesium (Mg), lanthanum (La), barium (Ba), praseodymium (Pr), strontium (Sr), potassium (K) and neodymium (Nd); and wherein incorporating into the hydroisomerization catalyst the one or more first modifiers and the one or more second modifiers comprises loading the calcined extrudate or formed particle with the one or more first modifiers and/or the one or more second modifiers to form a modified calcined extrudate or formed particle by: contacting the calcined extrudate or formed particle with a first impregnation solution comprising either the one or more first modifiers or the one or more second modifiers, optionally under sufficient impregnation conditions to impregnate the calcined extrudate or formed particle with at least about 0.1 wt. % of the respective one or more first modifiers or one or more second modifiers; and contacting the calcined extrudate or formed particle with a second impregnation solution comprising the corresponding other of the one or more second modifiers or the one or more first modifiers, optionally under sufficient impregnation conditions to impregnate the calcined extrudate or formed particle with at least about 0.1 wt. % of the respective one or more second modifiers or one or more first modifiers; or contacting the calcined extrudate or formed particle with a third impregnation solution comprising both the one or more first modifiers and the one or more second modifiers, optionally under sufficient impregnation conditions to impregnate the calcined extrudate or formed particle with at least about 0.1 wt. % of the one or more first modifiers and at least about 0.1 wt. % the one or more second modifiers, and drying the modified calcined extrudate or formed particle; or loading the molecular sieve with the one or more first modifiers and the one or more second modifiers prior to forming the mixture, optionally under sufficient conditions to load the molecule sieve with at least about 0.1 wt. % of the one or more first modifiers and at least about 0.1 wt. % the one or more second modifiers.

2. The method according to claim 1, wherein incorporating into the hydroisomerization catalyst the one or more first modifiers and the one or more second modifiers comprises loading the calcined extrudate or formed particle with the one or more first modifiers and/or the one or more second modifiers to form a modified calcined extrudate or formed particle by: contacting the calcined extrudate or formed particle with a first impregnation solution comprising either the one or more first modifiers or the one or more second modifiers, optionally under sufficient impregnation conditions to impregnate the calcined extrudate or formed particle with at least about 0.1 wt. % of the respective one or more first modifiers or one or more second modifiers; and contacting the calcined extrudate or formed particle with a second impregnation solution comprising the corresponding other of the one or more second modifiers or the one or more first modifiers, optionally under sufficient impregnation conditions to impregnate the calcined extrudate or formed particle with at least about 0.1 wt. % of the respective one or more second modifiers or one or more first modifiers; and drying the modified calcined extrudate or formed particle.

3. The method according to claim 1, wherein incorporating into the hydroisomerization catalyst the one or more first modifiers and the one or more second modifiers comprises loading the molecular sieve with the one or more first modifiers and the one or more second modifiers prior to forming the mixture, optionally under sufficient conditions to load the molecule sieve with at least about 0.1 wt. % of the one or more first modifiers and at least about 0.1 wt. % the one or more second modifiers.

4. The method according to claim 1, wherein incorporating into the hydroisomerization catalyst the one or more first modifiers and the one or more second modifiers comprises contacting the calcined extrudate or formed particle with a third impregnation solution comprising both the one or more first modifiers and the one or more second modifiers, optionally under sufficient impregnation conditions to impregnate the calcined extrudate or formed particle with at least about 0.1 wt. % of the one or more first modifiers and at least about 0.1 wt. % the one or more second modifiers.

5. The method according to claim 1, wherein: the molecular sieve has a silicon oxide to aluminium oxide mole ratio of about 70 to about 160; the molecular sieve comprises at least 80% polytype 6 of the total ZSM-48 type material present in the product; the molecular sieve comprises between about 0.1 and about 2 wt. % EU-1; and/or the crystallites collectively have an average aspect ratio of between about 1 and about 5.

6. The method according to claim 1, wherein the mixture comprises from about 5 wt. % to about 80 wt. % of the molecular sieve.

7. A hydroisomerization catalyst manufactured by the method according to claim 1.

8. The method according to claim 1, wherein incorporating into the hydroisomerization catalyst the one or more first modifiers and the one or more second modifiers comprises loading the hydroisomerization catalyst with about 0.1 wt. % to about 1.5 wt. % Mg.

* * * * *